Sept. 22, 1936. E. W. LORENZ 2,055,013
COLLAPSIBLE DRAG
Filed Sept. 16, 1935

Inventor
E. W. Lorenz
By Arthur H. Sturges
Attorney

Patented Sept. 22, 1936

2,055,013

UNITED STATES PATENT OFFICE 2,055,013

COLLAPSIBLE DRAG

Ervin W. Lorenz, Osmond, Nebr.

Application September 16, 1935, Serial No. 40,781

1 Claim. (Cl. 55—84)

The present invention relates to draft devices, and more particularly to an evener bar and draft means used in connection with harrows and drags, and has for an object to provide an evener bar which is collapsible or retractable so that it may be shortened to pass through gates, between trees, and other relatively narrow passages without requiring the uncoupling of the harrows and the complete separation and rearrangement of the parts.

Another object of the invention is to provide a simplified construction of draft gear for harrows and the like embodying an evener bar which is made in sections connected together by links so that the sections may be overlapped one upon the other to reduce the length of the evener bar and at the same time to move the drags or harrows carried by the sections into overlapping relation so that the entire device may be adjusted to a reduced width for passage through narrow spaces.

The invention also embodies an improved structure of evener bar made in pivotally connected sections which may freely follow undulations in the ground surface to maintain the harrows or drags in proper contact with the ground at all times and throughout the width of the device.

With the foregoing and other objects in view, the invention will be more fully described hereinafter, and will be more particularly pointed out in the claim appended hereto.

Figure 1:
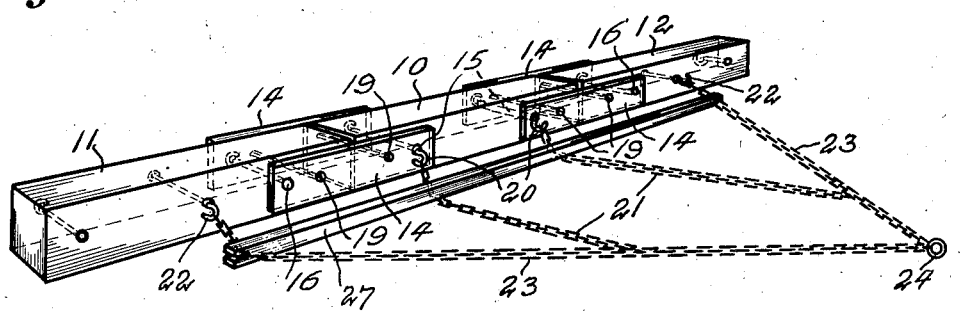

In the drawing, wherein like symbols refer to like or corresponding parts throughout the several views, Figure 1 is a perspective view of a draft rigging constructed according to the present invention.

Figure 2:
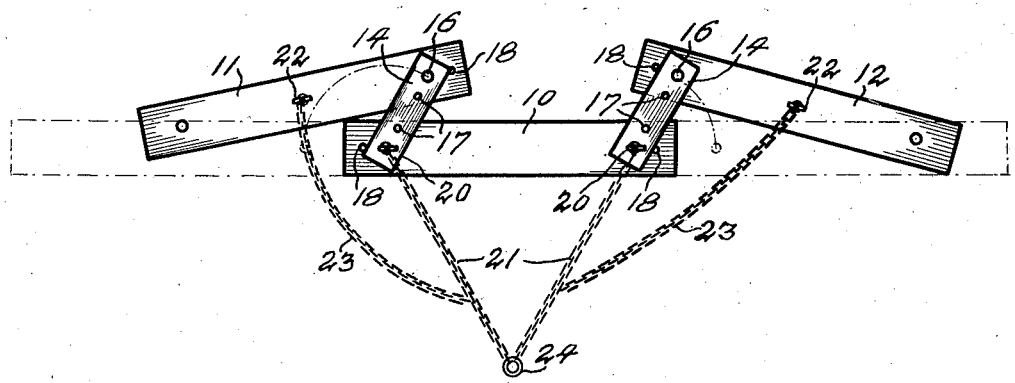
Figure 3:
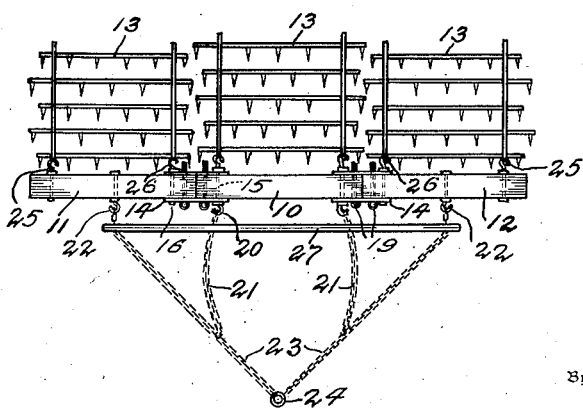

Figure 2 is a front elevation of the same, showing the sections of the evener bar collapsed to reduce the width of the evener bar, the draft chain being shown suspended from the bar, and Figure 3 is a top plan view of the draft equalizer having harrows or drags connected thereto.

Referring now to the drawing, the evener bar, which may be constructed in any desired number of sections, is shown in the present instance as comprising three sections 10, 11 and 12. These sections may comprise solid wood material of suitable length to accommodate a desired number of harrows 13 as shown in Figure 3. The middle section 10 is connected at opposite ends to the side sections 11 and 12 by links 14 which are disposed in pairs and with the inner ends of the links pivotally secured against the front and rear sides of the middle section 10 by pivot rods 15, and the outer ends of the links are secured against the front and rear faces of the side sections 11 and 12 by pivot rods 16. The links 14 overlap the adjacent end portions of the sections 10, 11 and 12 and the latter are spaced apart at their adjacent ends a distance sufficient to admit the swinging of the links about the pivots 15 and 16 to permit the sections 10, 11 and 12 to independently rise and fall as the evener bar is drawn over the ground and to also permit the folding or collapsing of the side sections 11 and 12 upwardly upon the end portions of the middle section 10 as shown in Figure 2. It is desirable at times to rigidly interlock the sections 10, 11 and 12 in straight line relation, and for this purpose the links 14 are provided in their opposite end portions with openings 17 and the sections 10, 11 and 12 are provided with corresponding openings 18 disposed in longitudinal alignment with adjacent pivots 15 and 16 to receive locking pins 19 adapted to be inserted through the openings 17 and 18 when aligned to hold the links 14 from swinging on their pivots.

The pivot rods 15 are provided at opposite ends with hooks 20 and the forward hooks detachably engage short draft chains 21 while the rear hooks 20 detachably engage a central or middle harrow 13 as shown in Figure 3. The side sections 11 and 12 of the evener bar each have a forward hook 22, and the hooks 22 detachably engage main draft chains 23 which converge forwardly and are connected together upon a hitch ring 24. The short chains 21 at their forward ends are secured to the main chains 23 at suitable points immediate the links of the respective chains so that when the draft is applied to the ring 24 the chains 21 and 23 will be drawn taut for transmitting the pull evenly to the sections 10, 11 and 12 of the evener bar.

Each side section, 11 and 12, is provided at its outer end with a rear hook 25, and the rear end of the pivot rod 16 of each side section is provided with a rear hook 26. The hooks 25 and 26 of each side section detachably engage a side harrow or drag 13 as shown in Figure 3.

For the purpose of maintaining the draft chains 21 and 23 in proper position at all times and from becoming entangled during operation and adjustment of the evener bar, a spreader bar 27 may be employed and which is provided at each end with a transverse slot 28 proportioned to receive therein and in edgewise position an adjacent link of the adjacent main draft chain 23 so as to hold the spreader bar 27 from shifting on the draft chains, and to hold a spreader bar across the short chains 21 as shown. This spreader bar 27 may of course be removed and is not necessary for all of the operations and adjustments of the device. When the evener bar is collapsed, as shown in Figure 2, the spreader bar 27 may be first removed.

In use, the evener bar is attached to the harrows 13 and the device drawn over the ground in the usual manner. The teeth of the harrows engage in the ground and if the ground is uneven the locking pins 19 may be removed so that the sections 10, 11 and 12 may move independently on the pivot rods 15 and 16 to follow the uneven surface and maintain their respective drags 13 at all times in contact with the ground surface.

When it is desired to drag the device through a narrow space, such as between trees, through a fence or the like and the narrow space is of less width than that of the evener bar, the locking pins 19 are removed from the sections and the end sections 11 and 12 are swung upwardly on the links 14 onto more or less overlapping relation upon the middle section 10, as shown in Figure 2, so that the length of the evener bar is reduced to a more or less extent as shown by the full and dotted lines of Figure 2. This adjustment of the evener bar also moves the side drags 13 into corresponding overlapping relation upon the middle drag 13 so that the entire device is reduced in width and may be freely drawn through a narrow space. The spreader bar 27 may be effectively used when the evener bar is extended but wherein the locking pins 19 are removed so that the side sections 11 and 12 will not readily buckle up over the middle section 10.

From the foregoing description it is thought to be obvious that a drag evener constructed in accordance with my invention is particularly well adapted for use by reason of the convenience and facility with which it may be assembled and operated, and it will also be obvious that my invention is susceptible of some change and modifications without departing from the principles and spirit thereof and for this reason I do not wish it to be understood as limiting myself to the precise arrangement and formation of the several parts herein shown in carrying out my invention in practice except as claimed.

I claim:

A draft rigging for harrows and the like comprising an evener bar having a plurality of endwise disposed sections, links pivoted to and interconnecting said sections and adapted to permit the relative rise and fall of the sections over undulations of the ground surface, draft chains connected to the forward sides of said sections, a spreader bar connected across said chains for holding the same in position during the relative movements of said sections of the evener bar, and independent harrow connections carried by said sections of the evener bar.

ERVIN W. LORENZ.